United States Patent
Takehara et al.

(10) Patent No.: US 7,092,328 B2
(45) Date of Patent: Aug. 15, 2006

(54) INFORMATION STORAGE MEDIUM AND INFORMATION RECORDING/PLAYBACK APPARATUS

(75) Inventors: Shintaro Takehara, Yokohama (JP); You Yoshioka, Yokohama (JP); Hideo Ando, Hino (JP); Kazuo Watabe, Yokohama (JP); Akihito Ogawa, Yokohama (JP); Kazuto Kuroda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 10/331,940

(22) Filed: Dec. 31, 2002

(65) Prior Publication Data

US 2003/0174604 A1  Sep. 18, 2003

(30) Foreign Application Priority Data

Jan. 9, 2002  (JP) .............................. 2002-002469

(51) Int. Cl.
    *G11B 5/09*  (2006.01)
(52) U.S. Cl. .............................. 369/47.22; 369/275.3; 369/47.27; 369/59.22
(58) Field of Classification Search .............. 369/47.27
    See application file for complete search history.

(56) References Cited

U.S. PATENT DOCUMENTS 5,450,086 A * 9/1995 Kaiser ........................ 342/42
6,104,682 A * 8/2000 Konishi .................... 369/44.34
6,333,903 B1 * 12/2001 Suzuki ....................... 369/47.4
6,442,119 B1 * 8/2002 Sunagawa ................ 369/47.53
6,587,417 B1 * 7/2003 Okamoto et al. ......... 369/59.22
6,693,873 B1 * 2/2004 Kondo et al. ............ 369/275.4
6,810,050 B1 * 10/2004 Nihei et al. .............. 372/38.02

FOREIGN PATENT DOCUMENTS

| JP | 54-160211 | 12/1979 |
| JP | 60-677 | 1/1985 |
| JP | 9-27127 | 1/1997 |
| JP | 9-106549 | 4/1997 |
| JP | 9-219024 | 8/1997 |
| JP | 2840631 | 10/1998 |
| JP | 2844638 | 10/1998 |
| JP | 2001-118255 | 4/2001 |

OTHER PUBLICATIONS

Japanese Patent Office Action dated Feb. 10, 2004.
U.S. Appl. No. 10/073,911, filed Feb. 14, 2002, Watabe et al.
U.S. Appl. No. 10/329,983, filed Dec. 17, 2002, Watabe et al.
U.S. Appl. No. 10/329,985, filed Dec. 27, 2002, Kuroda et al.
U.S. Appl. No. 10/330,010, filed Dec. 27, 2002, Yoshioka et al.
U.S. Appl. No. 10/330,012, filed Dec. 27, 2002, Ogawa et al.

* cited by examiner

*Primary Examiner*—Thang V. Tran
*Assistant Examiner*—Adam R. Giesy
(74) *Attorney, Agent, or Firm*—Pillsbury Winthrop Shaw Pittman, LLP

(57) ABSTRACT

An information storage medium according to an embodiment of this invention includes a wobble track whose wobble period is modulated by multi-frequency shift keying corresponding to playback control information, wherein the playback control information contains header data and address data, and the header data contains a VFO area formed from a predetermined frequency.

7 Claims, 10 Drawing Sheets

INFORMATION STORAGE MEDIUM AND INFORMATION RECORDING/PLAYBACK APPARATUS

CROSS-REFERENCE TO RELATED APPLICATIONS

This application is based upon and claims the benefit of priority from the prior Japanese Patent Application No. 2002-002469, filed Jan. 9, 2002, the entire contents of which are incorporated herein by reference.

BACKGROUND OF THE INVENTION

1. Field of the Invention

The present invention relates to an information storage medium having grooves concentrically or spirally formed, and to an information recording/playback apparatus for recording/playing back information to/from the information storage medium.

2. Description of the Related Art

Research and development of high-capacity information storage media, such as optical disks, is recently advancing. Jpn. Pat. Appln. KOKAI Publication No. 9-106549 discloses a technique for wobbling pre-grooves on an optical disk by frequency modulation corresponding to address data.

In the above prior art, however, the recording density of address data is low. For this reason, a large track length (groove) is required to record one address. For example, tracks corresponding to 16 sectors are required to record one address. In other words, tracks corresponding to 16 sectors must be played back to specify one address. A tracking error that may occur during a write is detected from a wobbled signal obtained by playing back tracks corresponding to 16 sectors. For this reason, an erase error due to the tracking error in the write mode ranges over 16 sectors at maximum. The erase error in 16 sectors means that all data in an error correction code block is destroyed. Data restoration is impossible, as a matter of course.

BRIEF SUMMARY OF THE INVENTION

It is an object of the present invention to provide an information storage medium in which address data are reflected on tracks at a high density. It is another object of the present invention to provide an information recording apparatus for recording information on an information storage medium in which pieces of position information are reflected on tracks at a high density. It is still another object of the present invention to provide an information playback apparatus for playing back information from an information storage medium in which pieces of position information are reflected on tracks at a high density.

In order to solve the above problems and achieve the objects, an information storage medium, information recording apparatus, and information playback apparatus according to an embodiment of the present invention have the following arrangements.

(1) An information storage medium according to an embodiment of the present invention comprises a wobble track whose wobble period is modulated by multi-frequency shift keying corresponding to playback control information, wherein the playback control information contains header data and address data, and the header data contains a VFO area formed from a predetermined frequency.

(2) An information storage medium on which information is recorded by an information recording apparatus according to an embodiment of the present invention comprises a wobble track whose wobble period is modulated by multi-frequency shift keying corresponding to playback control information, the playback control information containing header data and address data, and the header data containing a VFO area formed from a predetermined frequency, and the information recording apparatus comprises a read section configured to read a wobbled signal from the wobble period of the wobble track, a header data detection section configured to detect the header data from the wobbled signal, a generation section configured to input the wobbled signal to a loop circuit having a loop filter and generate a wobble clock, and a recording section configured to read the address data on the basis of the wobble clock and record target information at a target position on the basis of the address data, wherein the generation section comprises a setting section configured to set the loop filter to a first gain during a period when the header data is detected and set the loop filter to a second gain lower than the first gain during a period when the header data is not detected.

(3) An information storage medium from which information is played back by an information playback apparatus according to an embodiment of the present invention comprises a wobble track whose wobble period is modulated by multi-frequency shift keying corresponding to playback control information, the playback control information containing header data and address data, and the header data containing a VFO area formed from a predetermined frequency, and the information playback apparatus comprises a read section configured to read a wobbled signal from the wobble period of the wobble track, a header data detection section configured to detect the header data from the wobbled signal, a generation section configured to input the wobbled signal to a loop circuit having a loop filter and generate a wobble clock, and a playback section configured to read the address data on the basis of the wobble clock and play back target information from a target position on the basis of the address data, wherein the generation section comprises a setting section configured to set the loop filter to a first gain during a period when the header data is detected and set the loop filter to a second gain lower than the first gain during a period when the header data is not detected.

Additional objects and advantages of the invention will be set forth in the description which follows, and in part will be obvious from the description, or may be learned by practice of the present invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

DETAILED DESCRIPTION OF THE INVENTION

The feature of the present invention will be described first. An optical disk has wobble tracks whose wobble period is modulated by multi-frequency shift keying corresponding to playback control information. The playback control information contains header data and address data. The header data contains a VFO area indicated by a predetermined frequency. The VFO area is indicated by the highest frequency contained in multi-frequency shift keying. As described above, when multi-frequency shift keying is used, playback control information can be reflected (recorded) on the optical disk at a high density. In addition, when the VFO area is reflected by the highest frequency contained in multi-frequency shift keying, a sync code can accurately be detected from the VFO area. As a result, an accurate sync clock can be generated.

An embodiment of the present invention will be described below with reference to the accompanying drawing.

Figure 1:
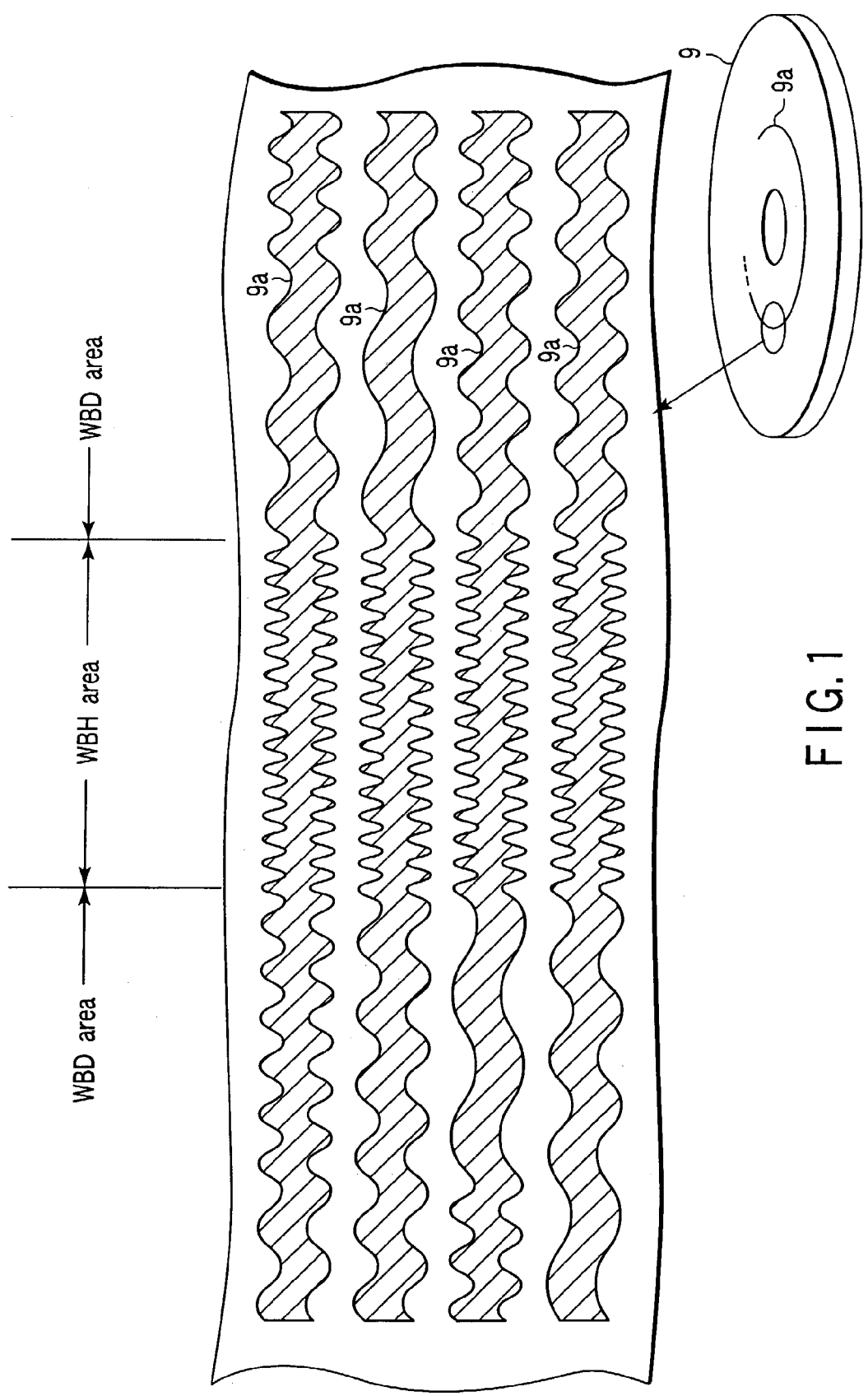
FIG. 1 is a view showing wobble tracks of an information storage medium (optical disk) according to an embodiment of the present invention.

FIG. 1 is a view showing wobble tracks of an information storage medium (optical disk) according to an embodiment of the present invention.

Figure 2:
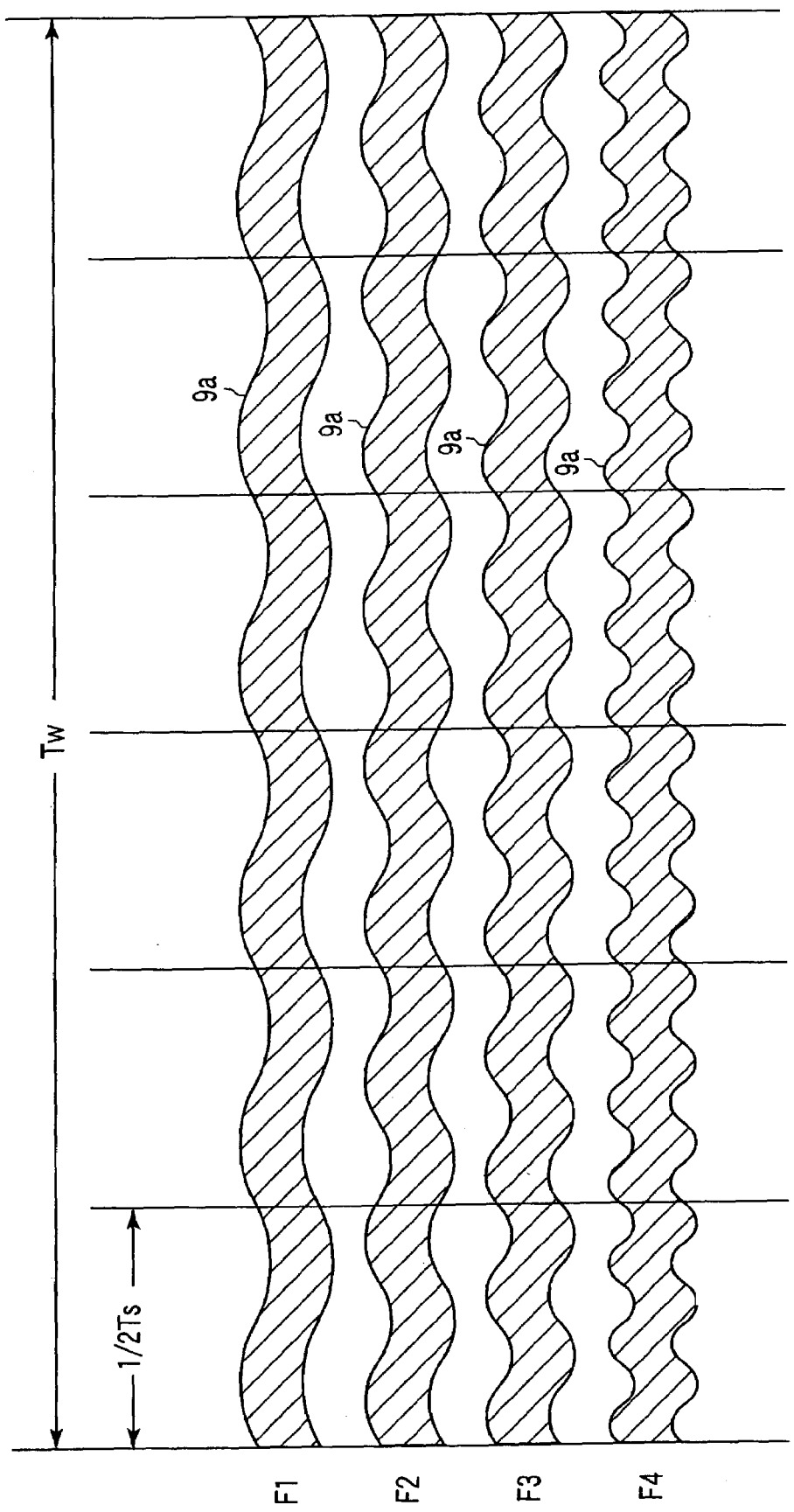
FIG. 2 is a view showing the relationship between frequencies and a symbol data interval Tw.

An optical disk 9 has wobble tracks 9a whose wobble period is modulated by multi-frequency shift keying corresponding to playback control information. that is, the playback control information of the optical disk is expressed by track wobbles using multi-frequency shift keying. Four-frequency MFSK will be exemplified below. However, the effect of the present invention can also be attained using any other frequency modulation. In a WBH (Wobble Header) area and WBD (Wobbled data) area, pieces of information including address data are expressed by 4-frequency MFSK using four frequencies F1, F2, F3, and F4. These frequencies correspond to SYMBL1, SYMBL2, SYMBL3, and SYMBL4, respectively. FIG. 2 shows the relationship between the frequencies and a symbol data interval Tw. Letting Ts be the least common multiple of 1/F1, 1/F2, 1/F3, and 1/F4, the symbol data interval Tw=N×Ts (N: integer). Referring to FIG. 2, Ts=2/F1=3/F2=4/F3=6/F4. Hence, Tw=3Ts. Since the waves of the respective frequencies satisfy orthogonal conditions within the range of 1/2Ts, the boundary position of Tw can be detected by delay detection.

Figure 3:
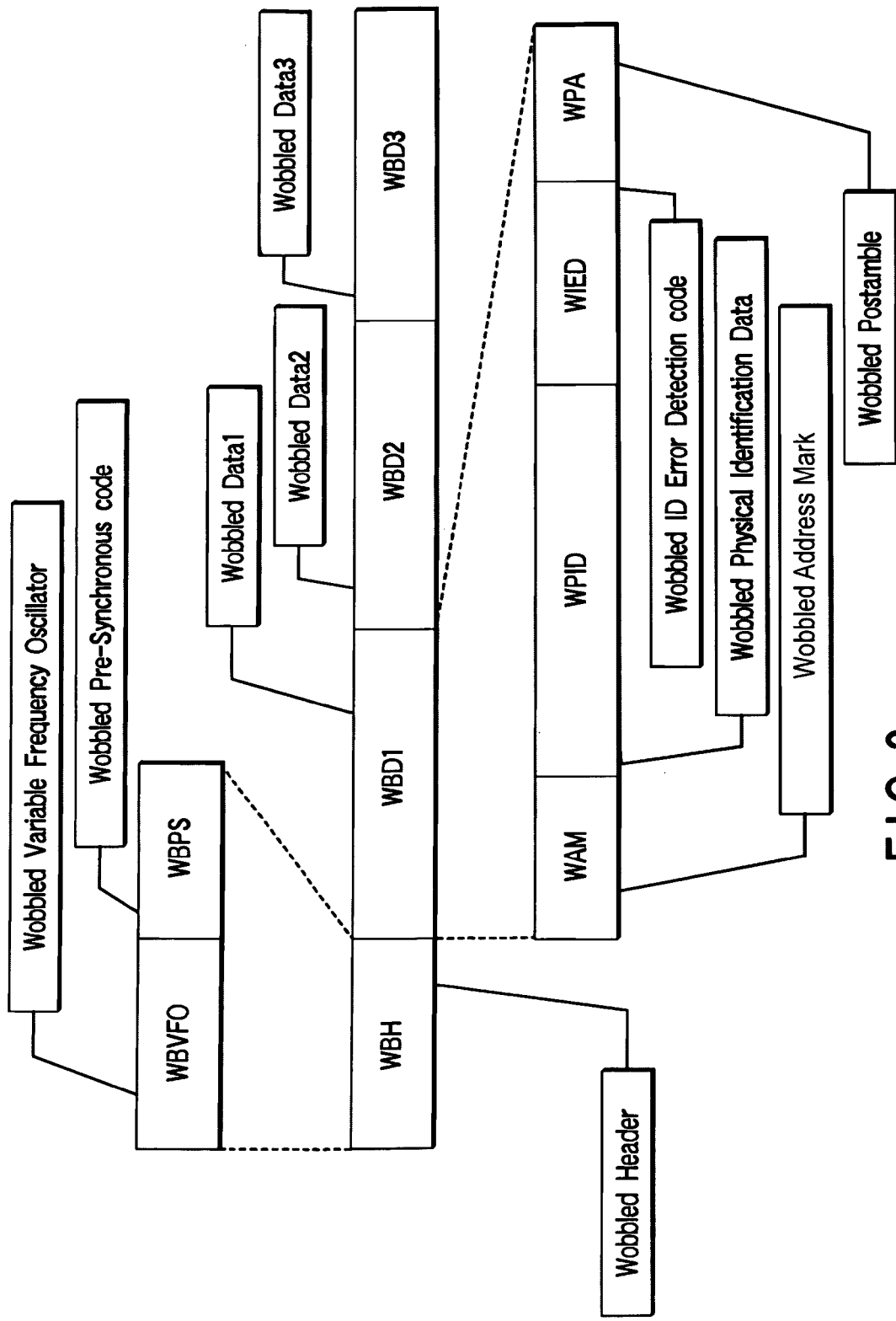
FIG. 3 is a view showing the data structure of wobbled data.

FIG. 3 is a view showing the data structure of wobbled data.

The WBH area includes two areas: a WBVFO (Wobbled Variable Frequency Oscillator) area in which a track wobbles at a predetermined frequency, and a WBPS (Wobbled Pre-Synchronous code) area in which specific data that synchronizes recording/playback data with a wobbled address is recorded. Especially, the wobble frequency in the WVFO area is the highest frequency contained in multi-frequency shift keying.

The WBD area is divided into, e.g., three areas WBD1 to WBD3. Each of the areas WBD1 to WBD3 includes four areas: a WAM (Wobbled Address Mark) area, WPID (Wobbled PID) area, WIED (Wobbled ID Error Detection code) area, and WPA (Wobbled PostAmble) area. The WAM area is an area which stores a byte sync signal for playback of wobble PID (Physical Identification Data). The WPID area is an area which stores segment ID information. The WIED area is an area which stores information for error detection of PID. The WPA area is an area which follows the WIED and completes a byte adapted to the modulation scheme.

Figure 14:
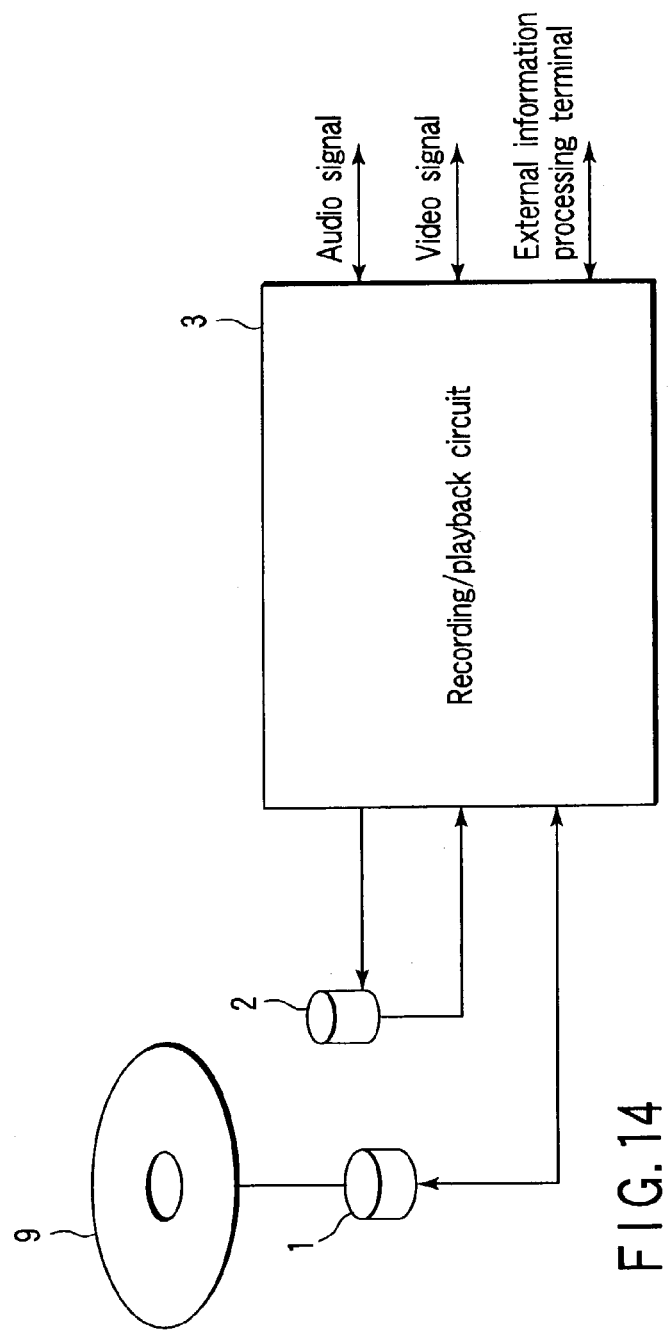
FIG. 14 is a view showing the schematic arrangement of an information recording/playback apparatus for recording or playing back information on or from an information storage medium.

FIG. 14 is a view showing the schematic arrangement of an information recording/playback apparatus for recording or playing back information on or from the information storage medium (optical disk) 9.

This information recording/playback apparatus records or rewrites (includes an erase of information) new information at a predetermined position on the information storage medium 9 using a focused spot, or plays back already recorded information from a predetermined position on the information storage medium 9 using a focused spot.

A spindle motor 1 rotates the information storage medium 9 under the control of a recording/playback circuit 3. An optical pickup 2 is focus- and tracking-controlled by the recording/playback circuit 3 to focus light to a predetermined position on the information storage medium 9. In a playback mode, a playback signal detected by the optical pickup 2 is input to the recording/playback circuit 3. The recording/playback circuit 3 executes demodulation and decoding processing for the playback signal to play back information. At this time, wobbled data is also demodulated and used to control playback. In a recording mode, modulation and encoding processing are executed by a data input/output circuit and the recording/playback circuit 3. The signal output from the recording/playback circuit 3 is sent to the optical pickup 2. The information storage medium 9 (optical disk) is irradiated with a laser beam emitted from the optical pickup 2, thereby recording information on the information storage medium 9. Even during recording, wobbled data is demodulated and used to control recording.

The above-described information recording/playback apparatus records information on the information storage medium 9 having the wobbled grooves 9a whose wobble period is modulated by multi-frequency shift keying corresponding to playback control information. More specifically, the recording/playback circuit 3 reads a wobbled signal from the wobble period of the wobbled grooves 9a, demodulates playback control information from the wobbled signal, and records target information at a target position on the basis of the playback control information.

The above-described information recording/playback apparatus also plays back information from the information storage medium 9 having the wobbled grooves 9a whose wobble period is modulated by multi-frequency shift keying corresponding to playback control information. More specifically, the recording/playback circuit 3 reads a wobbled signal from the wobble period of the wobbled grooves 9a, demodulates playback control information from the wobbled signal, and plays back target information from a target position on the basis of the playback control information.

Figure 4:
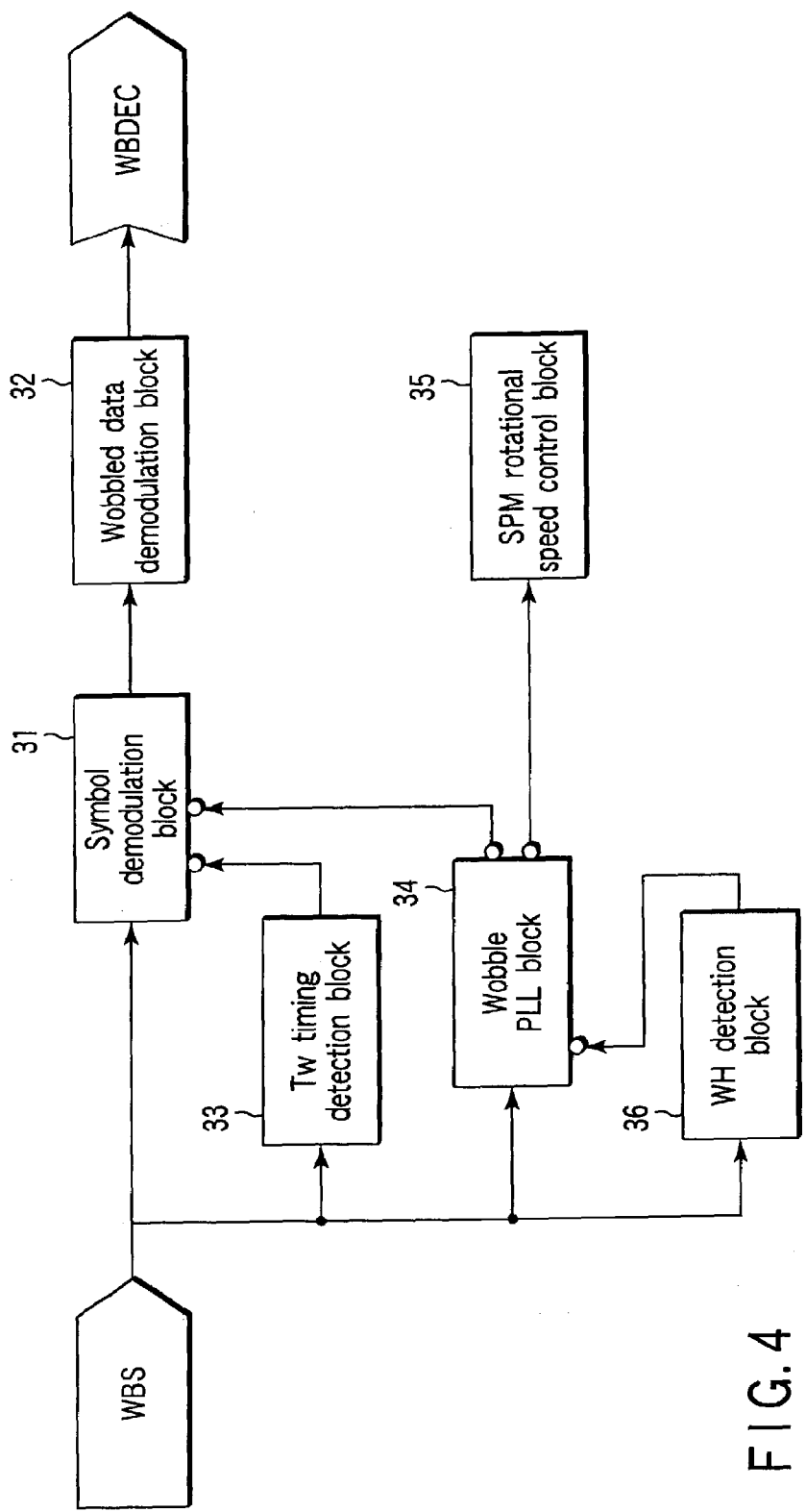
FIG. 4 is a block diagram showing the schematic arrangement of a wobbled data demodulation circuit included in a recording/playback circuit.

FIG. 4 is a block diagram showing the schematic arrangement of a wobbled data demodulation circuit included in the recording/playback circuit 3 shown in FIG. 14. The wobbled data demodulation circuit demodulates wobbled data from a wobbled signal (WBS). As shown in FIG. 4, the wobbled data demodulation circuit comprises a symbol demodulation circuit 31, wobbled data demodulation circuit 32, Tw timing detection circuit 33, wobble PLL circuit 34, SPM rotational speed control circuit 35, and WH detection circuit 36.

Figure 5:
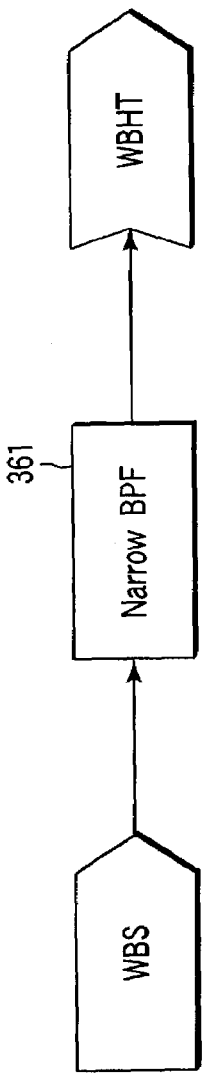
FIG. 5 is a block diagram showing the schematic arrangement of a WH detection circuit.

FIG. 5 is a block diagram showing the schematic arrangement of the WH detection circuit 36. As shown in FIG. 5, the WH detection circuit 36 has a narrow BPF (BandPass Filter) 361. The center frequency of the narrow BPF 361 is set in the WBH. When the WBS reaches the WVFO area included in the WBH, a signal is output from the narrow BPF, so a timing WBHT of the WH can be output.

Figure 6:
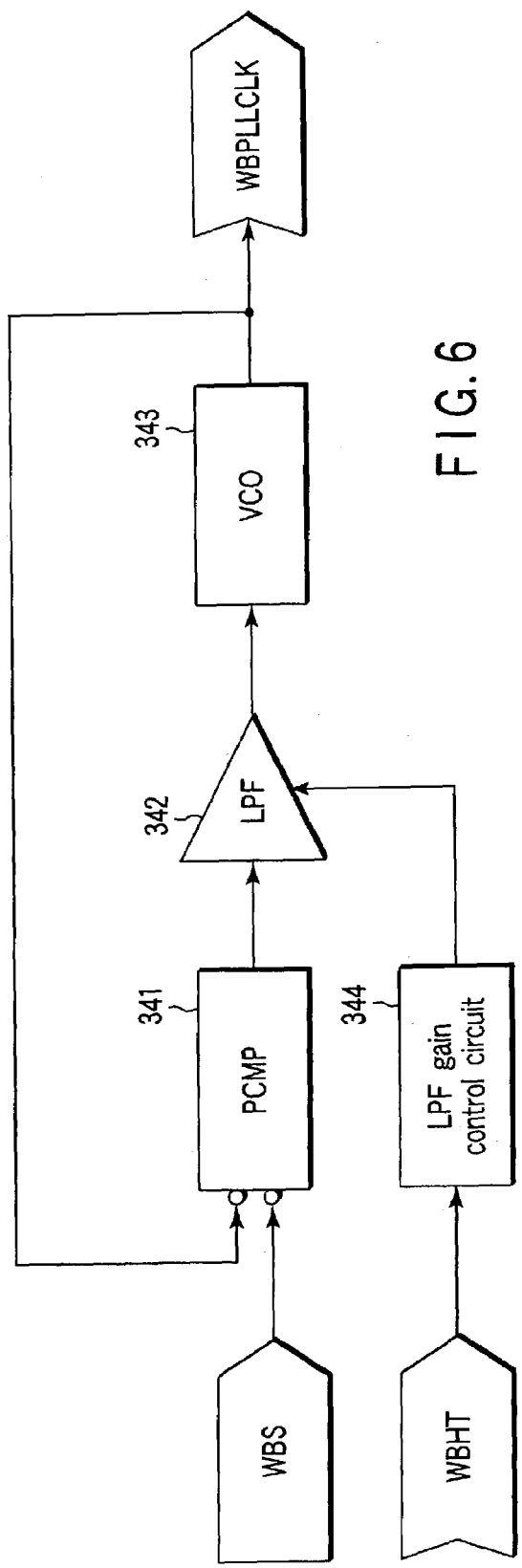
FIG. 6 is a block diagram showing the schematic arrangement of a wobble PLL circuit.

FIG. 6 is a block diagram showing the schematic arrangement of the wobble PLL circuit 34. The wobble PLL circuit 34 comprises a phase comparator (PCMP) 341, LPF (Loop Filter) 342, VCO (Voltage Controlled Oscillator) 343, and LPF gain control circuit 344. The LPF gain control circuit 344 adjusts the gain of the LPF in accordance with the WBHT signal. As the wobble frequency in the WBVFO area, the highest frequency F4 in the WBD area is used.

Figure 7:
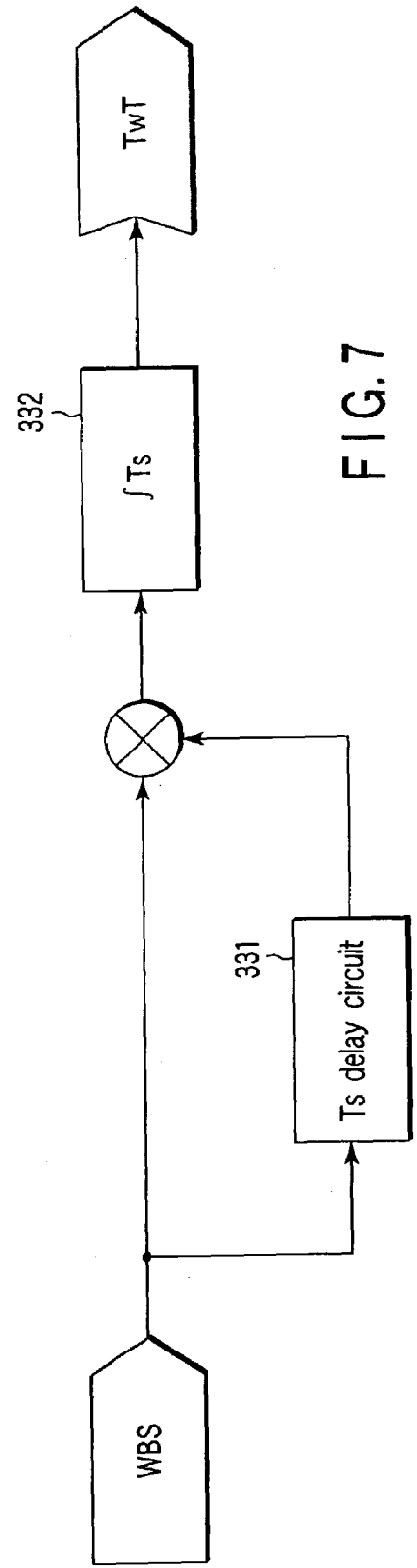
FIG. 7 is a block diagram showing the schematic arrangement of a Tw timing detection circuit.

FIG. 7 is a block diagram showing the schematic arrangement of the Tw timing detection circuit 33. The Tw timing detection circuit 33 integrates for a time Tw the difference between a wobbled signal and a delayed wobbled signal, which is obtained by delaying the wobbled signal by time Ts, and detects the switching timing of a symbol representing playback control information on the basis of the integration result. The Tw timing detection circuit 33 has a Ts delay circuit 331, multiplier, and Ts integrator. The Ts delay circuit 331 outputs a WBDS obtained by delaying the WBS by time Ts. The multiplier outputs a multiplication result WBMLT between the WBS and the WBDS. The Ts integrator outputs a result obtained by integrating the WBMLT for the time Ts, i.e., WBCONV signal.

Figure 8:
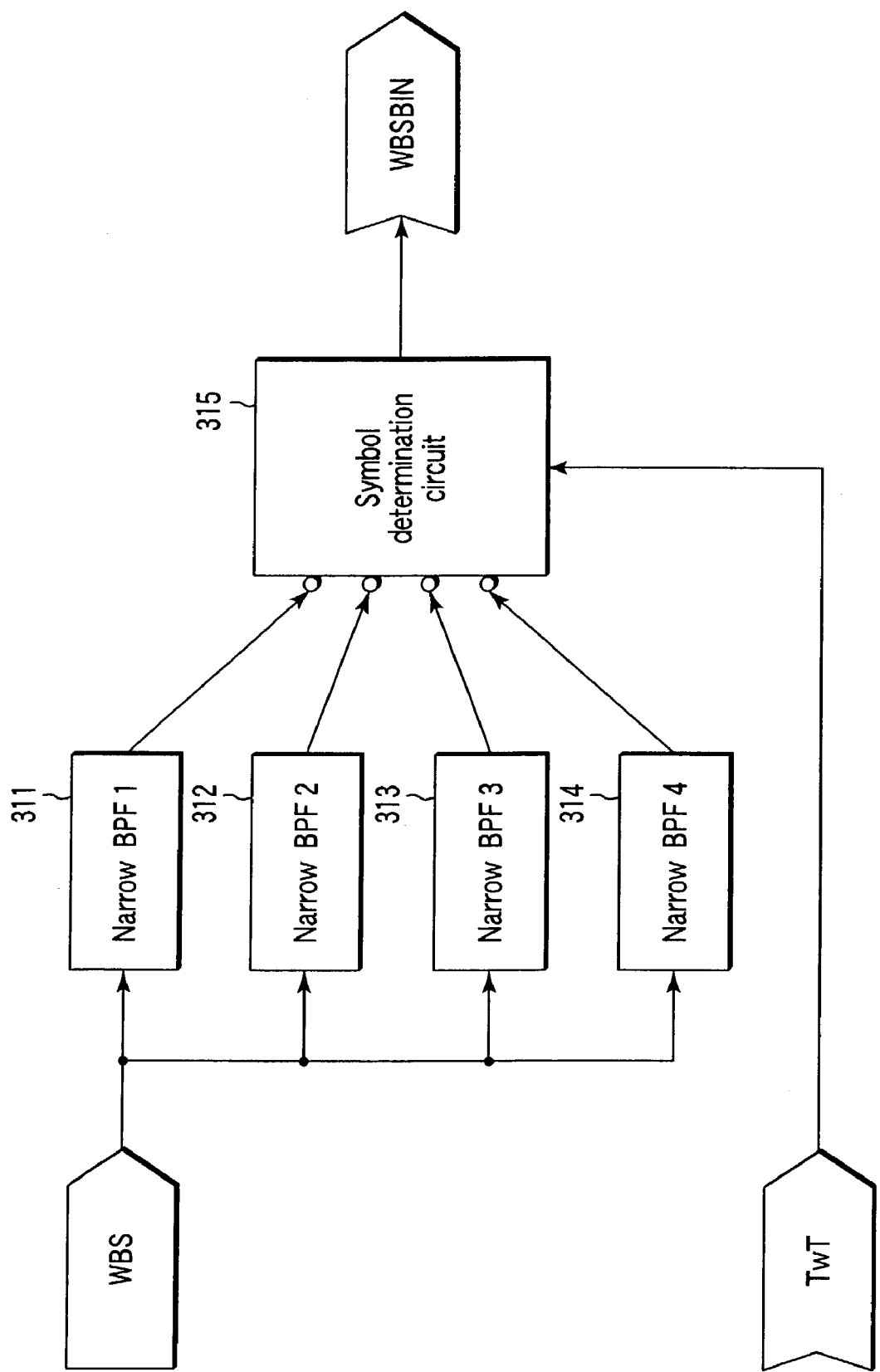
FIG. 8 is a block diagram showing the schematic arrangement (Example 1) of a symbol demodulation circuit.

FIG. 8 is a block diagram showing the schematic arrangement of the symbol demodulation circuit 31. The symbol demodulation circuit 31 demodulates a symbol from the wobbled signal. On the basis of the timing detected by the Tw timing detection circuit 33, the symbol demodulation circuit 31 selects the wobbled signal having the highest signal intensity from the plurality of wobbled signals output through a plurality of narrow bandpass filters BPF1 to BPF4. The symbol demodulation circuit 31 has a narrow BPF1 (311), narrow BPF2 (312), narrow BPF3 (313), narrow BPF4 (314), and symbol determination circuit 315. The symbol determination circuit 315 determines a symbol from the outputs from the bandpass filters BPF1 to BPF4. The center frequencies of the narrow bandpass filters BPF1 to BPF4 correspond to F1, F2, F3, and F4, respectively.

The symbol demodulated by the symbol demodulation circuit 31 is input to the wobbled data demodulation circuit 32. The wobbled data demodulation circuit 32 demodulates address data and the like.

Figure 9:
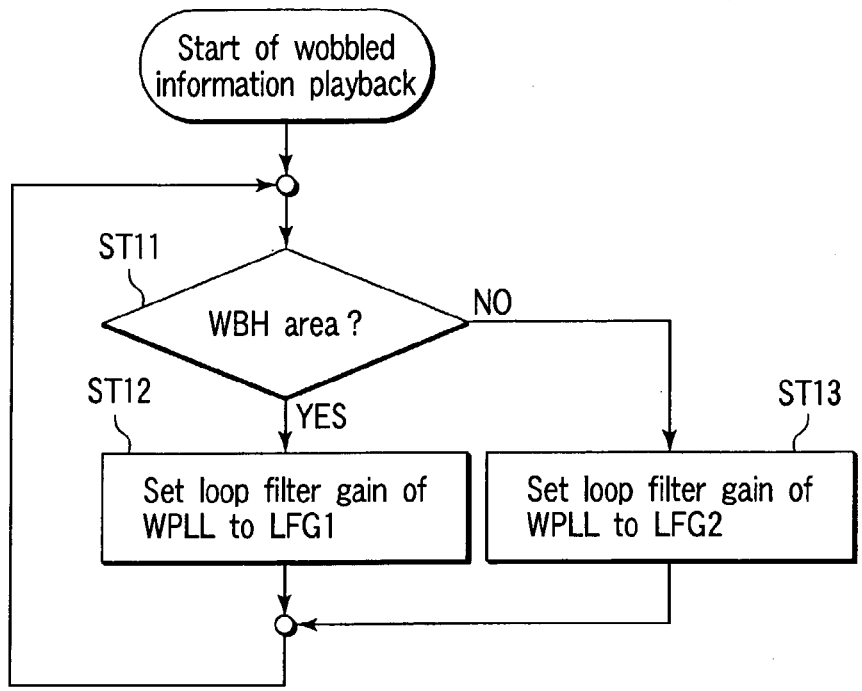
FIG. 9 is a flow chart showing wobbled signal playback processing of multi-frequency shift keying scheme.

Processing for playing back a wobbled signal of multi-frequency shift keying using the above circuits will be described with reference to FIG. 9. FIG. 9 is a flow chart showing a wobble PLL processing method.

If it is determined on the basis of the WBHT signal that the wobbled signal WBS has reached the WBH area (YES in ST11), the gain of the LPF is set to LFG1 (ST12). If the WBS has reached an area other than the WBH area (NO in ST11), the gain of the LPF is set to LFG2 (ST13). At this time, LFG1 and LFG2 satisfy LFG1>LFG2. More specifically, in the WBH area including the WVFO area formed from a single frequency, the gain of the loop filter of the wobble PLL is increased such that the PLL can readily be locked. However, in an area other than the WBH area containing a plurality of frequency components, the gain of the loop filter of the wobble PLL is decreased not to cause PLL pull-out. It is more effective when LFG2=0.

Figure 10:
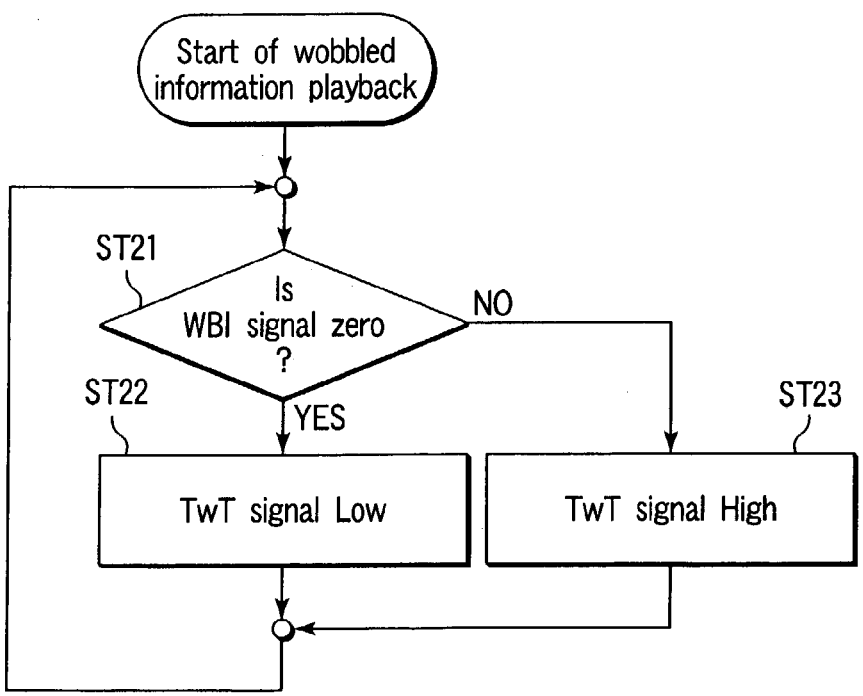
FIG. 10 is a flow chart showing a method of detecting the symbol interval Tw.

FIG. 10 is a flow chart showing a method of detecting the symbol interval Tw.

The frequency components of the signals contained in a wobble satisfy orthogonal conditions at the time Ts. For this reason, the WBCONV signal convoluted at the time Ts becomes zero every time the symbol is switched at the time Tw (ST21). A symbol switching timing signal TwT synchronous with the wobbled signal can be output from the WBCONV signal (ST22 and ST23).

Figure 11:
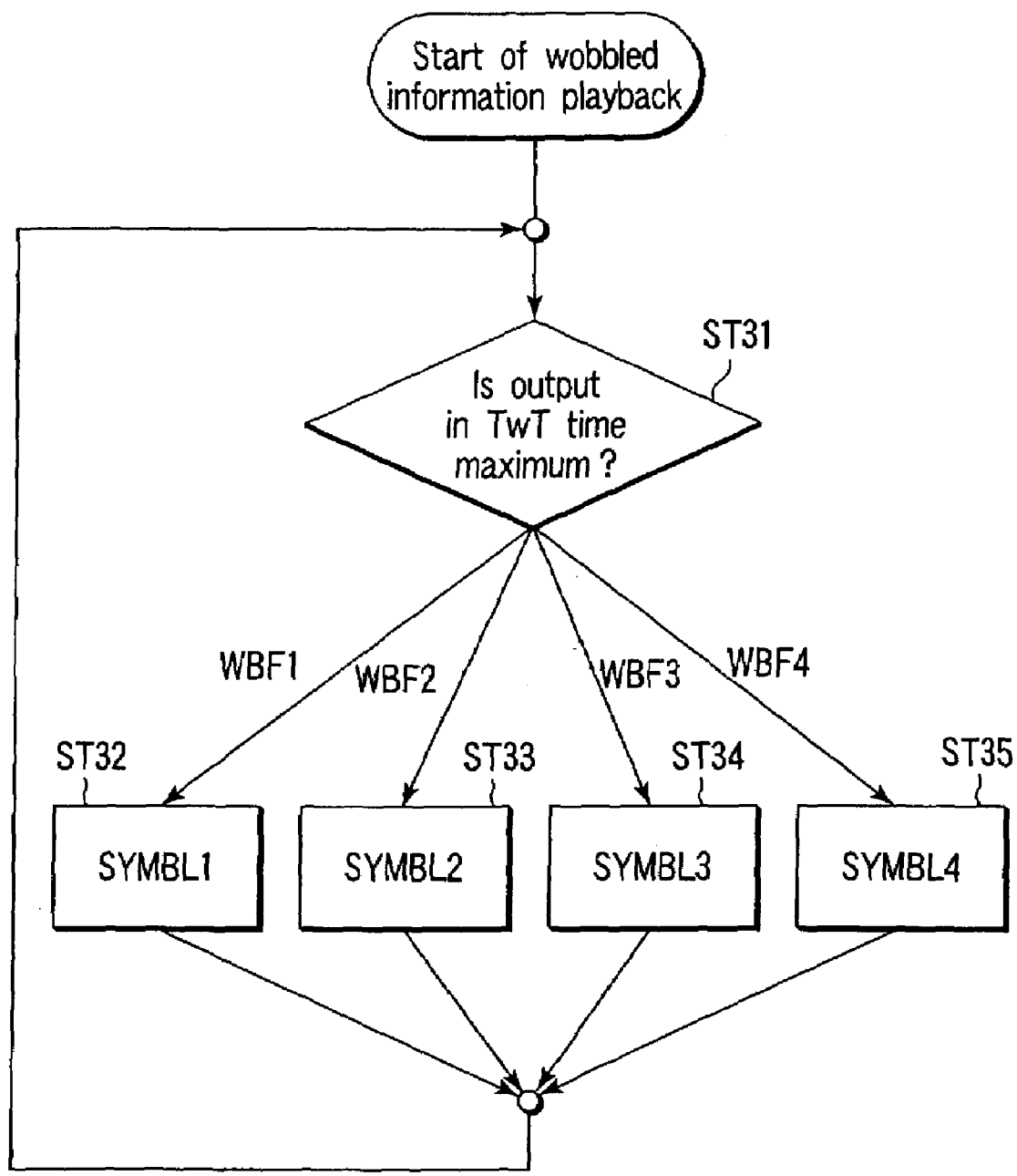
FIG. 11 is a flow chart showing a symbol demodulation processing method.

FIG. 11 is a flow chart showing a symbol demodulation processing method.

Outputs WBF1 to WBF4 from the narrow bandpass filters BPF1 to BPF4 correspond to symbols SYMBL1 to SYMBL4 contained in the time Tw. In the outputs WBF1 to WBF4, the maximum output is determined within the TwT signal time detected by the Tw detection circuit (ST31), and the symbols SYMBL1 to SYMBL4 are output (ST32 to ST35). The determined symbol is converted into a corresponding binary signal so that information recorded in a wobble can be played back by the wobbled data demodulation circuit.

In this way, information that is recorded in a wobble by 4-frequency MFSK is demodulated.

Figure 12:
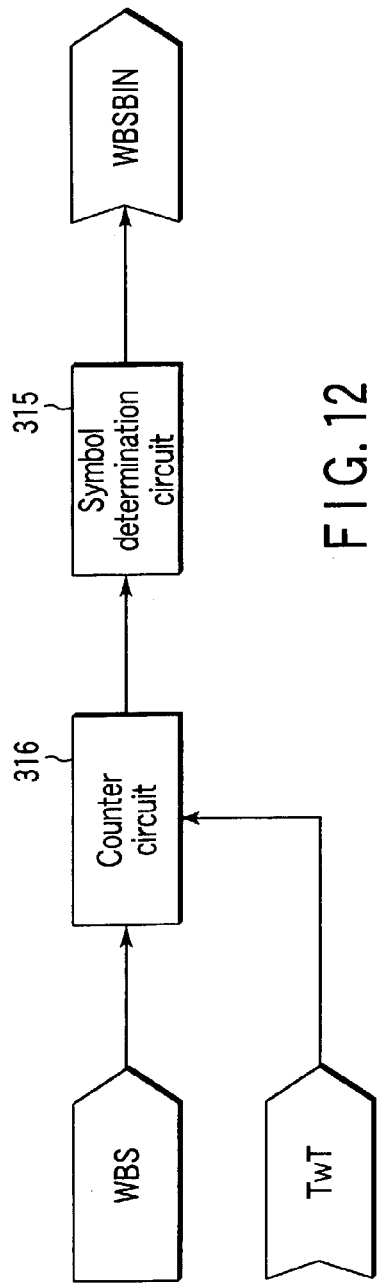
FIG. 12 is a block diagram showing the schematic arrangement (Example 2) of the symbol demodulation circuit.

A modification will be described next. Assume that a symbol demodulation circuit 31 as shown in FIG. 12 is used. The symbol demodulation circuit 31 has a counter circuit 316 and symbol determination circuit 315. The counter circuit 316 outputs (counts) the number WBN of waves of the WBS during the period Tw. The symbol determination circuit converts the wobbled signal into a symbol in accordance with the WBN signal.

Figure 13:
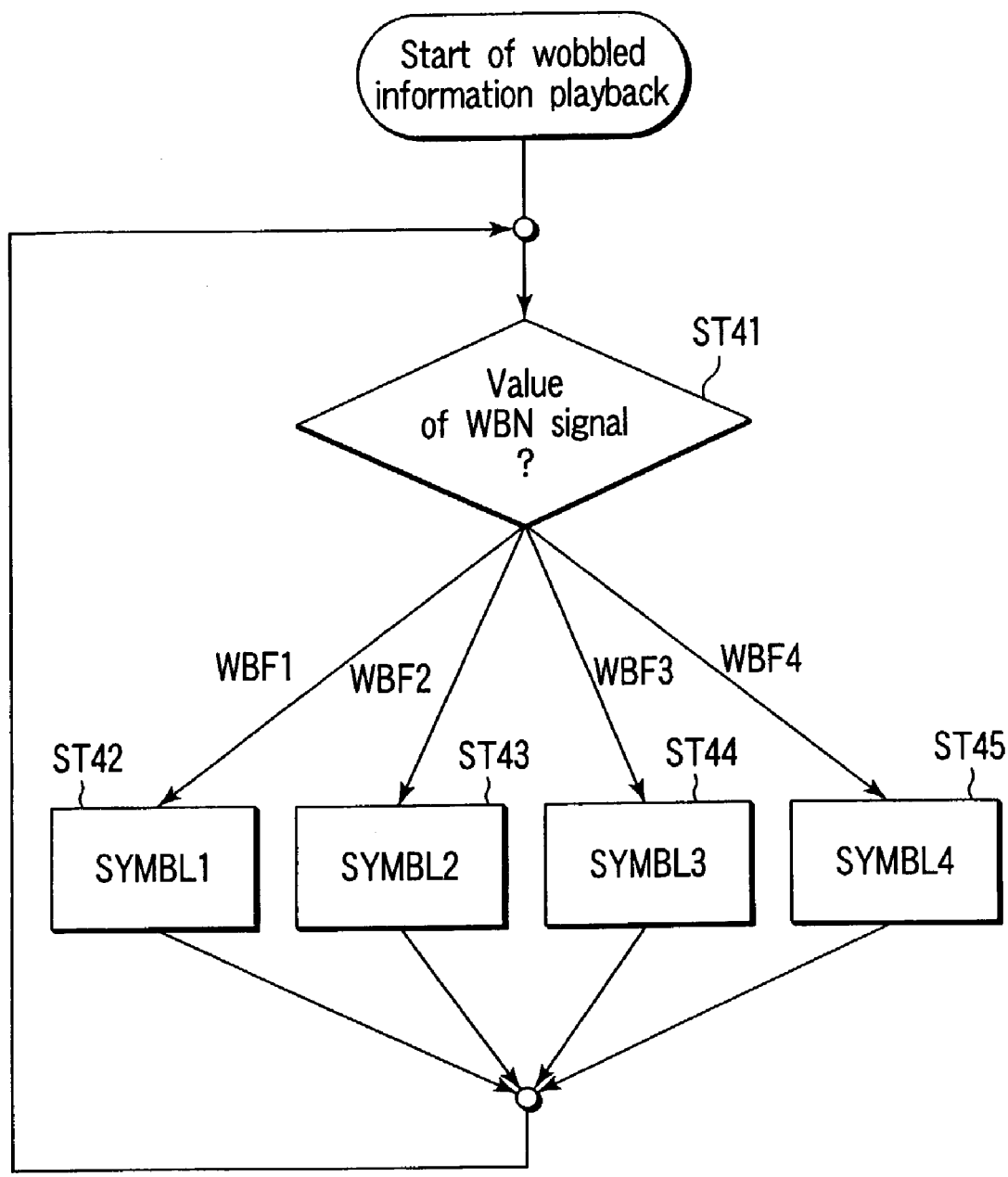
FIG. 13 is a flow chart showing wobbled signal playback processing by the symbol demodulation circuit shown in FIG. 12.

FIG. 13 is a flow chart showing wobbled signal playback processing by the symbol demodulation circuit shown in FIG. 12.

Since the WBN signal has one of the values of the numbers WBN1 to WBN4 of waves corresponding to F1 to F4 (ST41), the symbols SYMBL1 to SYMBL4 can be discriminated in accordance with one of WBN1 to WBN4, which matches the WBN signal (ST42 to ST45). A WBSBIN signal is demodulated by the wobbled data demodulation circuit shown in FIG. 4.

Another modification will be described. Assume that a frequency F0 in the WBVFO area satisfies F0=1/Ts. In this case as well, the frequencies F0, F1, F2, F4, and F4 satisfy orthogonal conditions during the period Ts. In this case, since the frequency in the WBVFO area is high, phase comparison is often executed. Hence, a wobble sync clock can be more stably generated. In addition, when a narrow bandpass filter whose center frequency is F0 is used, the WBVFO area can more easily be detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
a wobble track having a wobble period that is modulated by multi-frequency shift keying corresponding to playback control information containing address data and header data, the
header data including a VFO (Variable Frequency Oscillator) area formed from a predetermined frequency, and
frequencies contained in the multi-frequency shift keying satisfy orthogonal conditions,
wherein a minimum time interval for which the frequencies satisfy the orthogonal conditions is defined as Ts,
wherein a time interval for which a symbol that indicates the playback control information changes is defined as Tw,
wherein the VFO area is formed from the highest frequency contained in the multi-frequency shift keying, and
wherein the symbol is configured to be demodulated by an information playback apparatus comprising (i) a plurality of narrow bandpass filters corresponding to the frequencies contained in the multi-frequency shift keying, (ii) a timing detection section configured to integrate over the time Tw a difference between the wobbled signal and a delayed wobbled signal, which is obtained by delaying the wobbled signal by the time Ts, and to detect a switching timing of the symbol that indicates the playback control information based on an integration result, (iii) a selection section configured to select a wobbled signal having the highest signal intensity from a plurality of wobbled signals output through the plurality of narrow bandpass filters based on the timing detected by the timing detection section, and (iv) a symbol demodulation section configured to demodulate the symbol from the wobbled signal selected by the selection section.

2. An information recording apparatus for recording information on an information storage medium having a wobble track that has a wobble period that is modulated by multi-frequency shift keying corresponding to playback control information, the playback control information containing header data and address data, and the header data containing a VFO (Variable Frequency Oscillator) area formed from a predetermined frequency, the information recording apparatus comprising:
a read section configured to read a wobbled signal from the wobble period of the wobble track;
a header data detection section configured to detect the header data from the wobbled signal;
a generation section configured to input the wobbled signal to a loop circuit having a loop filter and generate a wobble clock; and
a recording section configured to read the address data on the basis of the wobble clock and record target information at a target position on the basis of the address data,
wherein the generation section comprises a setting section configured to set the loop filter to a first gain during a period when the header data is detected and set the loop filter to a second gain lower than the first gain during a period when the header data is not detected,
wherein frequencies contained in the multi-frequency shift keying satisfy orthogonal conditions,
wherein a minimum time internal for which the frequencies satisfy the orthogonal conditions is defined as Ts,
wherein a time interval for which a symbol that indicates the playback control information changes is defined as Tw,
wherein the VFO area is formed from the highest frequency contained in the multi-frequency shift keying, and
wherein the apparatus further comprises:
a plurality of narrow bandpass filters corresponding to the frequencies contained in the multi-frequency shift keying,
a timing detection section configured to integrate over the time Tw a difference between the wobbled signal and a delayed wobbled signal which is obtained by delaying the wobbled signal by the time Ts, and to detect a switching timing of the symbol that indicates the playback control information based on an integration result,
a selection section configured to select a wobbled signal having the highest signal intensity from a plurality of wobbled signals output through the plurality of narrow bandpass filters based on the timing detected by the timing detection section, and
a symbol demodulation section configured to demodulate the symbol from the wobbled signal selected by the selection section.

3. An apparatus according to claim 2, wherein the second gain is zero.

4. An apparatus according to claim 2, wherein:
the apparatus further comprises a count section configured to count the wobbled signals supplied between a predetermined timing detected by the timing detection signal and a next timing, and
the symbol demodulation section demodulates the symbol from the wobbled signal in accordance with a count result of the count section.

5. An information playback apparatus for playing back information from an information storage medium having a wobble track that has a wobble period that is modulated by multi-frequency shift keying corresponding to playback control information, the playback control information containing header data and address data, and the header data containing a VFO (Variable Frequency Oscillator) area formed from a predetermined frequency, the information playback apparatus comprising:
a read section configured to read a wobbled signal from the wobble period of the wobble track;
a header data detection section configured to detect the header data from the wobbled signal;
a generation section configured to input the wobbled signal to a loop circuit having a loop filter and generate a wobble clock; and
a playback section configured to read the address data on the basis of the wobble clock and play back target information from a target position on the basis of the address data,
wherein the generation section comprises a setting section configured to set the loop filter to a first gain during a period when the header data is detected and set the loop filter to a second gain lower than the first gain during a period when the header data is not detected, wherein frequencies contained in the multi-frequency shift keying satisfy orthogonal conditions, wherein a minimum time interval for which the frequencies satisfy the orthogonal conditions is defined as Ts, a time interval for which a symbol that indicates the playback control information changes is defined as Tw, wherein the VFO area is formed from the highest frequency contained in the multi-frequency shift keying, and wherein the apparatus further comprises:

a plurality of narrow bandpass filters corresponding to the frequencies contained in the multi-frequency shift keying, a timing detection section configured to integrate over the time Tw a difference between the wobbled signal and a delayed wobbled signal, which is obtained by delaying the wobbled signal by the time Ts, and to detect a switching timing of the symbol that indicates the playback control information based on an integration result, a selection section configured to select a wobbled signal having a highest signal intensity from a plurality of wobbled signals output through the plurality of narrow bandpass filters based on the timing detected by the timing detection section, and a symbol demodulation section configured to demodulate the symbol from the wobbled signal selected by the selection section.

6. An apparatus according to claim 5, wherein the second gain is zero.

7. An apparatus according to claim 5, wherein the apparatus further comprises a count section configured to count the wobbled signals supplied between a predetermined timing detected by the timing detection signal and a next timing, and the symbol demodulation section demodulates the symbol from the wobbled signal in accordance with a count result of the count section.

* * * * *